United States Patent [19]

Corcoran

[11] Patent Number: 4,839,869
[45] Date of Patent: Jun. 13, 1989

[54] METHODS FOR PROCESSING CONVERTED WAVE SEISMIC DATA

[75] Inventor: Chris T. Corcoran, Houston, Tex.

[73] Assignee: Shell Oil Company, Houston, Tex.

[21] Appl. No.: 915,434

[22] Filed: Oct. 6, 1986

[51] Int. Cl.$^4$ ............................................. G01N 1/36
[52] U.S. Cl. ....................................... 367/53; 367/38; 367/51; 367/73
[58] Field of Search ....................... 367/38, 47, 50, 53, 367/51, 52, 63, 73; 364/421

[56] References Cited

U.S. PATENT DOCUMENTS

| | | | |
|---|---|---|---|
| 2,354,548 | 1/1944 | Ricker | 177/352 |
| 4,596,005 | 6/1986 | Frasier | 367/38 |
| 4,597,066 | 6/1986 | Frasier | 367/38 |
| 4,611,311 | 9/1986 | Frasier | 367/38 |

OTHER PUBLICATIONS

Long-Wave Elastic Anisotropy in Transversely Isotropic Media, Geophys, vol. 44, No. 5, pp. 896-917 (1979) Berryman, J.
Seismic Velocities from Surface Measurements, Geophysics 20, pp. 68-86 (1955) Dix, C.A.
$V_p/V_s$-A Potential Hydrocarbon Indicator, Geophysics 41, pp. 837-849 (1967) Tatham, R. H. and Stoffa, P. L.
Composite Reflections, Geophysics 15, pp. 30-50 (1950) Ricker, N. and Lynn, R. D.
Velocity Anisotropy of Seismic Waves: Field Observations, S.E.G. 1983 Ann. Mtg. Extended Absts. (1983) Sriram, K. P., Fulton, T. W., Nooteboom J. J. and Seriff, A. J.
Improvements in the Observation of Shear Waves, Geophy. Prosp. 28, pp. 208-220 (1980) Dohr, G. and Janle, H.
Wave Propagation in a Stratified Medium, Geophysics, vol. 20, No. 4, pp. 780-806 (1955) Postma, G. W.
Velocity Spectra-Digital Computer Derivation and Applications of Velocity Functions, Geophy 34, p. 859-881 (1969) Tanner, M. T. and Koehler, F.

Primary Examiner—Thomas H. Tarcza
Assistant Examiner—Ian J. Lobo

[57] ABSTRACT

The present invention provides methods for processing converted wave seismic data which includes, fractional point gathering of the data in a manner consistent with a selected velocity model, dynamic correction of the data using parameters measured from the data to account for the asymmetric travel path of the converted wave rays and stacking the dynamically corrected data. Methods are also provided for updating the velocity model.

22 Claims, 6 Drawing Sheets

SYMMETRICAL

ASYMMETRICAL

METHODS FOR PROCESSING CONVERTED WAVE SEISMIC DATA

BACKGROUND OF THE INVENTION

The present invention relates to seismic exploration and more particularly, relates to the processing of seismic exploration data to enhance seismic signals resulting from the conversion of compressional waves (P-wave) to shear waves ($S_v$-wave), or shear waves to compressional waves, upon reflection from contrasts or differences in elastic properties in the earthen subsurface.

Conventional compressional wave seismic land or marine acquisition techniques involve the use of an appropriate source to generate compressional energy and a set of receivers spread out along or near the earthen surface to detect any seismic signals due to compressional energy being reflected from subsurface geologic boundaries. These signals are recorded as a function of time and subsequent processing of these signals, i.e. seismic data, is designed to reconstruct an appropriate image of the subsurface. In simplistic terms, this conventional process has a compressional wave travelling down into the earth, reflecting from a particular geologic layer (impedance contrast), and returning to the receiver as a compressional wave. Data from such a process is denoted herein as "PP" data since a compressional wave (P) goes down from the surface (1st P) and back up to the surface (2nd P); for water covered areas this may be a "PPPP" process since compressional waves are also relied on both in the water and in the earth. In reality, many different types of waves are created in this conventional acquisition scheme and the use of receivers with their sensitive axes oriented vertically (approximately parallel to particle motion for compressional waves), as well as the subsequent processing of the recorded data are designed so that the desired type or types of waves (such as signals representing PP data) is enhanced relative to other types of waves whose signals are considered noise.

Shear wave data is conventionally acquired by using a source which introduces particle motion transverse to the desired direction of wave propagation and then detecting the seismic signal with receivers whose sensitive axes are oriented horizontally. Two different types of shear waves (denoted herein as "S") may be acquired: $S_h$, where the particle motion is perpendicular to, or across, the line from the source to the receiver or geophone; and $S_v$, where the particle motion is along, or in, the plane defined by the source, reflector, and receiver or geophone. While the characteristics and interpretation of these two types of shear waves may be quite different, both types of acquisition are denoted herein as SS to emphasize the symmetry resulting from the fact that both the downgoing wave (1st S) and reflected wave (2nd S) are shear waves. Shear seismic data may provide additional information about the properties of the subsurface geologic layers which may be valuable in the exploration for hydrocarbons ("$V_P/V_S$— A Potential Hydrocarbon Indicator", Geophysics 41, pp. 837–849 (1976) Tatham, R. H. and Stoffa, P. L.).

Shear waves of the $S_v$ type may also be generated by conversion from a compressional wave transmitted through or reflected from an appropriate interface. In the converted shear case the particle motion of the converted wave is transverse to the direction of wave propagation but in-line with respect to the source-receiver direction. These waves may be seen in conventional PP seismic records but their observation can be enhanced by modifying the conventional compressional wave acquisition geophone axes slightly (i.e. placing geophones with their detection axes horizontally in-line rather than vertical). Seismic signals which are predominantly shear-waves may then be detected and may also be recorded. These waves are created by the partitioning of the energy of the compressional wave as it is reflected from an elastic interface. Shear waves of this type are called converted waves, or PS waves, and are well known among exploration seismologists ("Composite Reflections", Geophysics 15, pp. 30–50 (1950) Ricker, N. and Lynn, R. D.; see also U.S. Pat. No. 2,354,548, issued July 25, 1944 to Ricker). When properly interpreted they may provide information about the properties of the subsurface that is quite similar to that provided by SS data. Converted waves of the SP type (i.e. shear wave generated at the source travelling down and converting to a P-wave upon reflection) may also be acquired and will have the same properties as a PS converted wave with an interchange of source and receiver positions and names.

There are two characteristics of converted waves (PS or SP) which distinguish them from either conventional PP or SS waves. First, the travel path is asymmetric; compressional energy travels downward with a compressional velocity $V_P(Z)$, and after reflection travels upward with a shear velocity $V_S(Z)$. $V_P(Z)$ and $V_S(Z)$ are both generally functions of depth, Z, and $V_S$ is normally much less than $V_P$. Second, since the shear velocity is usually much smaller than the compressional velocity in the same material, the velocity distribution (i.e. the velocities experienced by the energy travelling down and back up) of a converted wave is much broader than if the wave had been a pure compressional (PP) or pure shear (SS) wave over its entire path. To understand how these two characteristics affect the basic conventional processing methods of velocity analysis and the so-called common midpoint stack (which are designed to enhance seismic signals), these basic conventional processing methods will be briefly discussed for PP and SS data.

The earth model utilized herein for this discussion of the analysis of basic processing methods or strategy is one for which velocities vary with depth due to layering, but not laterally. The seismic reflection from an interface in such a stratified medium will arrive at the receiver at a time, defined and used herein as T(X), where X is defined and used herein as the distance between the source and the receiver, or "offset" distance. This "moveout time" T(X) may be used to "dynamically correct" seismic data acquired at an offset distance X so that the data appears as if it had been acquired at zero offset, i.e. X=0. Further, the square of this moveout time has a well known expansion about $$T^2(X) = T_0^2 + a_1 X + a_2 X^2 + a_3 X^3 + a_4 X^4 + \ldots \quad (1)$$

where the coefficients $a_i$ are moments of the normal propagation (interval) velocity. For the case of horizontal reflectors all of the odd terms must be zero by symmetry since interchanging source and receiver positions, which corresponds to a change in the sign of the offset distance X, will necessarily have the same travel time. Experience with compressional wave (PP) data has indicated that the P-wave vertical velocity distributions are such that, in most areas, within the offset range ($X<2Z$), and frequency ranges (5-100Hz) normally considered in exploration seismology, terms higher than $X^2$ may be ignored. That is, deviations from the so called "normal hyperbolic moveout" (NMO) are minimal compared to other errors. This is equivalent to approximating the stratified earth with a single horizontal layer, having an "effective" velocity, $V_e$. For this simplified case Equation 1 reduces to the familiar hyperbolic moveout expression $$T^2(X) = T_0^2 + X^2/V_e^2, \quad (2)$$

where $$V_e^2 = \frac{2\int V(Z)dZ}{T_0}, \quad (3a)$$

and $$T_0 = 2\int[dZ/V(Z)] \quad (3b)$$

If the reflector of interest is not horizontal but is angled or dipping then this analysis and the equations become somewhat more complicated. While velocities may still be uniform laterally, for dipping reflectors it becomes necessary to specify a particular point in the model about which moveout analysis is being considered. The depth to the reflector is specified by the distance from the point to the surface along a line that is normal to the reflector at that point and extends to the surface.

Figure 1A:
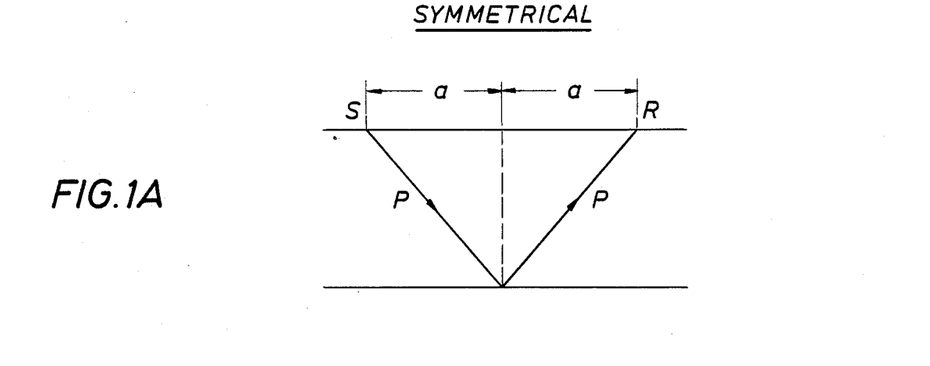
FIGS. 1A–1D depict simplified ray paths for various types of seismic waves.
Figure 1B:
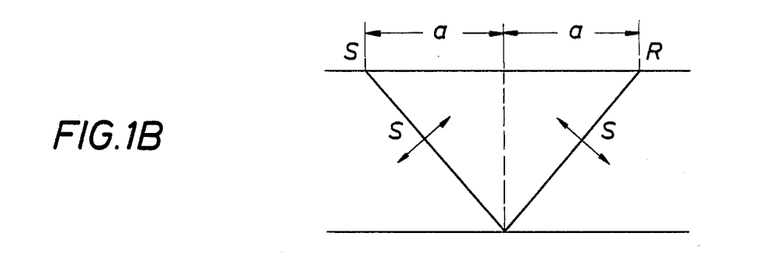

Conventional processing of PP or SS data gathers the data by the common mid-point (CMP) technique and relies on symmetry to use the "mid-point" between the source (S) and receiver (R) positions as a surface gather point, as seen in FIGS. 1A and 1B. That is, after the data have been acquired for a number of sequential source positions they are sorted or gathered into different midpoint groups which have the same or "common" surface location of one "midpoint" between the various source and receiver positions. The motivation for a CMP sort or gather for PP or SS data is two-fold. First a CMP sort corresponds to all ray-paths for this gather having a common reflection point (CRP) in the subsurface, if the reflectors are horizontal; thus, this sort minimizes the lateral smear of the horizontal events in stacked data resulting from this sort. Second, and probably more important, the common midpoint sort causes the odd power terms in the moveout time expression given by Equation 1 to be zero for PP and SS events, even for dipping reflectors. This is easily shown to be true by symmetry, since sources and receivers may be interchanged, thus changing the sign of the offset distance, with no change in the overall raypath.

In summary, common midpoint processing of PP and SS data using the hyperbolic (Equation 2) moveout analysis works because:

(1) the vertical velocity distributions are generally narrow enough that higher order terms are not significant for the standard offset ranges and frequency bands considered in exploration seismology;

(2) the raypath source/receiver symmetry insures that all odd-order terms will be zero; and (3) the reflection point lateral smear associated with common midpoint sorting is negligible for small dip angles, and is of less concern than moveout analysis errors.

Figure 1C:
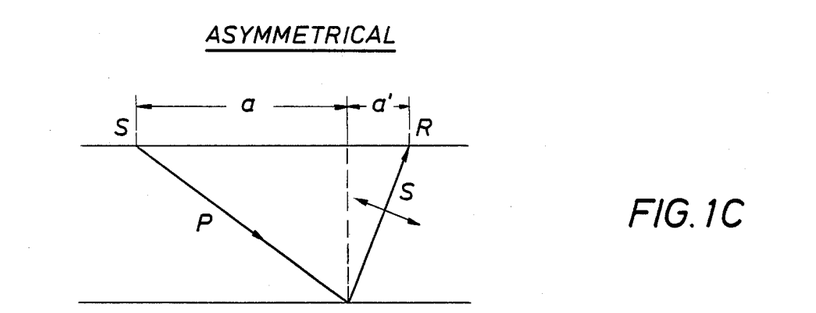
Figure 1D:
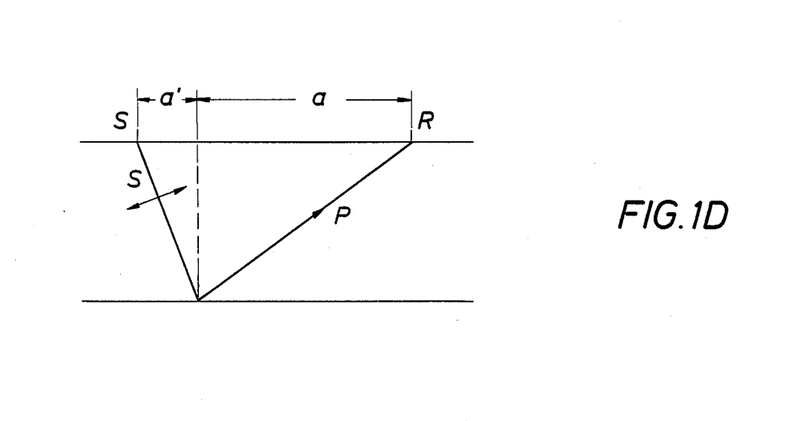

Converted wave data meet none of these three conditions. The fact that shear velocities are significantly smaller than P-wave velocities, often by a factor of two or more, creates a very broad total velocity distribution which causes the higher order terms in the moveout expression of Equation 1 to be significant even at the moderate offset distances used in seismic exploration employing converted waves. The asymmetry of the ray-path, as shown in FIG. 1C, down with velocity $V_P$ and up with velocity $V_S$, causes the odd order terms to be non-zero for dipping reflectors, and in fact these terms are quite significant. The reflection point for PS data is not the midpoint between source and receiver positions even for horizontal reflectors, but varies with both offset distance and depth even for a constant velocity model (i.e. $V_P(Z)=V_1$ and $V_S(Z)=V_2$, both $V_1$ and $V_2$ constant); similarly, for SP data the reflection point is not the midpoint, as shown in FIG. 1D.

There are two additional physical aspects which have much greater significance for PS data than for PP or SS. First, the reflection (conversion) coefficient for PS seismic events is always zero at normal incidence and for small incidence angles increases as the sine of the incidence angle. The behavior of the reflection coefficient at large angles (long offsets) depends on the elastic properties of the media on each side of the reflecting interface, as does the behavior of PP, $S_hS_h$, or $S_vS_v$ reflection coefficients. The important difference is that while stacking PP and SS data may be thought of as an attempt to enhance the normal incidence signal, this is not the case for PS data because there is no normal incidence signal. Thus, processing and interpretation procedures which are based on derivations using small angle assumptions may be perfectly suitable for PP and SS data, but may be totally inadequate for converted wave data.

Second, velocity anisotropy plays a more fundamental role in PS processing than in PP or SS. For the layered earth model, the velocity field is transversely isotropic with the axis of symmetry perpendicular to the surface. For transversely isotropic media pure compressional (P) and pure shear ($S_v$) modes occur only along the axis of symmetry. Off this axis, these modes are mixed and are referred to as pseudo-P and pseudo-$S_v$. When the terms "P" and "S" modes (or waves) are used herein in the presence of anisotropy, these terms mean the appropriate "pseudo" mode (or wave).

The velocity anisotropy of a transversely isotropic elastic medium may be completely characterized by the density (p) and five independent elastic constants for that medium; these constants are normally $C_{11}$, $C_{12}$, $C_{13}$, $C_{33}$ and $C_{44}$. Thus, is these elastic constants and density are known or specified, the P, $S_h$, and $S_v$ velocities may be determined for any direction of wave propagation. Alternatively one can completely characterize the velocity field by specifying the vertical velocities and the apparent anisotropy factors $A_{Sh}$, $A_P*$, $A_{Sv}*$ ("Velocity Anisotropy of Seismic Waves: Field Observations", S.E.G. 1983 Annual Meeting Extended Abstracts (1983) Sriram, K. P., Fulton, T. W., Nooteboom, J. J. and Seriff, A. J.). For example, some equations for such an alternate characterization are, $$V_P = \sqrt{\frac{C_{33}}{\rho}} \quad (4a)$$

$$V_{SV} = V_{SH} = \sqrt{\frac{C_{44}}{\rho}} \quad (4b)$$

$$A_P{}^* = \sqrt{\frac{C_{44}(C_{33} - C_{44}) + (C_{13} + C_{44})^2}{C_{33}(C_{33} - C_{44})}} \quad (4c)$$

$$A_{SV}{}^* = \sqrt{\frac{C_{11}(C_{33} - C_{44}) - (C_{13} + C_{44})^2}{C_{44}(C_{33} - C_{44})}} \quad (4d)$$

$$A_{SH} = \sqrt{\frac{C_{11} - C_{12}}{2C_{44}}} \quad (4e)$$

These anisotropy factors represent the coefficients of an elliptical fit to the velocity function $V(\theta)$ at normal incidence. That is, these parameters are coefficients derived from matching an elliptical asymptotic limit ($\theta$ going to zero) to the correct wavefront and, they uniquely determine the necessary combinations of elastic constants required to calculate the true wavefront at all angles.

Generalizing equations 3a and 3b to include the case of transverse isotropy, as well as the case where the downward and upward propagating waves have different velocities (i.e. PS or SP), gives, $$V_{ePS}^2 = V_{eSP}^2 = \frac{\int [A_P{}^{*2} V_P(Z) + A_S{}^{*2} V_S(Z)] dZ}{T_{OPS}} \quad (3c)$$

$$T_{OPS} = T_{OSP} = \int \left[ \frac{1}{V_P(Z)} = \frac{1}{V_S(Z)} \right] dZ. \quad (3d)$$

For the case of horizontal layers is the coefficient of the quadratic term in the moveout time expansion in equation 1.

The apparent horizontal velocity, $V_h{}^* = A^* V_V$, (where $V_V$ is vertical velocity) is the quantity which is deduced from normal moveout velocity analysis using offset ranges normally encountered in conventional exploration seismology. While the difference between apparent horizontal and vertical velocity is important for converting from travel time to depth for seismic data display and interpretation, the explicit inclusion of anisotropy is generally not important for the proper dynamic (NMO) correction of PP and SS seismic data (in the limits normally encountered in exploration seismology).

For PS (or SP) data this is not the case for several reasons. First, $S_V$-wave apparent anisotropy factors can be quite large compared to P-wave anisotropy factors. Second, the P-wave angles of incidence encountered in PS seismic data acquisition will generally be much larger than those encountered in PP seismic data acquisition. Third, since dipping reflectors have a significant effect on PS travel time determination, it is important to be able to measure these dip angles from the seismic section, which requires a knowledge of the anisotropies involved (similar to time-to-depth conversion for PP seismic data).

Many successful methods for moveout (NMO) velocity analysis and dynamic correction of PP and SS seismic data have been in use since the late 1960's. The display techniques which are used herein are similar to those developed over the years for use with conventional hyperbolic velocity analysis, as described for instance by Taner and Koehler ("Velocity Spectra-Digital Computer Derivation And Applications Of Velocity Functions", Geophysics 34, pp. 859–881 (1969) Tanner, M. T. and Koehler, F.).

The need for an improved method to dynamically correct (NMO) PS seismic data has been recognized by Dohr and Janle ("Improvements In The Observation Of Shear Waves", Geophysical Prospecting 28, pp. 208–220 (1980) Dohr, G. and Janle, H.) who proposed using a double quadratic expression for the moveout function T(X) which would properly correct PS data for a horizontal reflector if one were able to determine the appropriate $V_P$ and $V_S$, as well as the reflection point. However, they did not describe a method for determining the velocities from the seismic data, account for the possibility of dipping reflectors, nor account for anisotropy.

These and other limitations and disadvantages of the prior art are overcome by the present invention, however, and improved methods are provided for determining fractional sort point gathers, dynamic corrections, estimates of interval velocities from effective velocities, and better stacked sections resulting therefrom.

SUMMARY OF THE INVENTION

In a preferred embodiment of the present invention seismic data that has been acquired employing a plurality of known source and receiver locations is processed to provide gathers based upon a fixed fractional surface sort point that minimizes any lateral smear of reflection points at depth ranges of interest for seismic data from an area of interest. The gathered data may then be dynamically corrected by taking into account an appropriate shear and compressional velocity and travel time and then the corrected data may be stacked or otherwise processed. Methods are also provided for determining interval velocities.

It is an object of the present invention to provide a method for gathering converted wave seismic data employing fixed fractional surface sort points.

It is an object of the present invention to provide methods for dynamic correction of converted wave data which properly account for the asymmetry of the travel path of converted waves.

These and other objects and advantages of the present invention will become apparent from the following detailed description, wherein reference is made to the Figures in the accompanying drawings.

BRIEF DESCRIPTION OF THE DRAWINGS

FIG. 5 A&B depict a simplified representation of derived velocities from normal hyperbolic moveout analysis and the moveout analysis of the present invention for selected field data.

FIGS. 6 A&B depict the corresponding moveout corrected panels resulting from the same data and velocities of FIG. 5.

FIGS. 7 A&B depict stacked seismograms for a different set of field data dynamically corrected with and without accounting for reflector dip.

FIGS. 8 A&B depict a representation of derived velocity data from the field data of FIG. 7, illustrating dip effects.

DETAILED DESCRIPTION OF THE INVENTION

Converted wave data (PS or SP) may be acquired using a multiplicity of sources and receivers, such as for example, but not limited to the conventional "roll-along" technique. Such converted wave data may be acquired concurrent with or separate from conventional PP or SS data. The present invention provides methods for processing converted wave seismic field data acquired with conventional techniques which includes: fractional surface sort point gathering of the data in a manner consistent with a regional velocity model which may be developed from properties of the data, and dynamic correction of the data, thereby accounting for the asymmetric travel path of the converted ray using parameters measured from the data; the dynamically corrected data may also be corrected for statics and stacked to enhance signals. Further, additional processing steps may be performed as necessary or desired before or after any of these steps. The terms "fractional surface sort point", "fixed fractional surface sort point" and "fractional sort point" are used as equivalents herein. The dynamic correction method of the present invention may also be employed to process PP and SS seismic data, or their equivalents.

Figure 2:
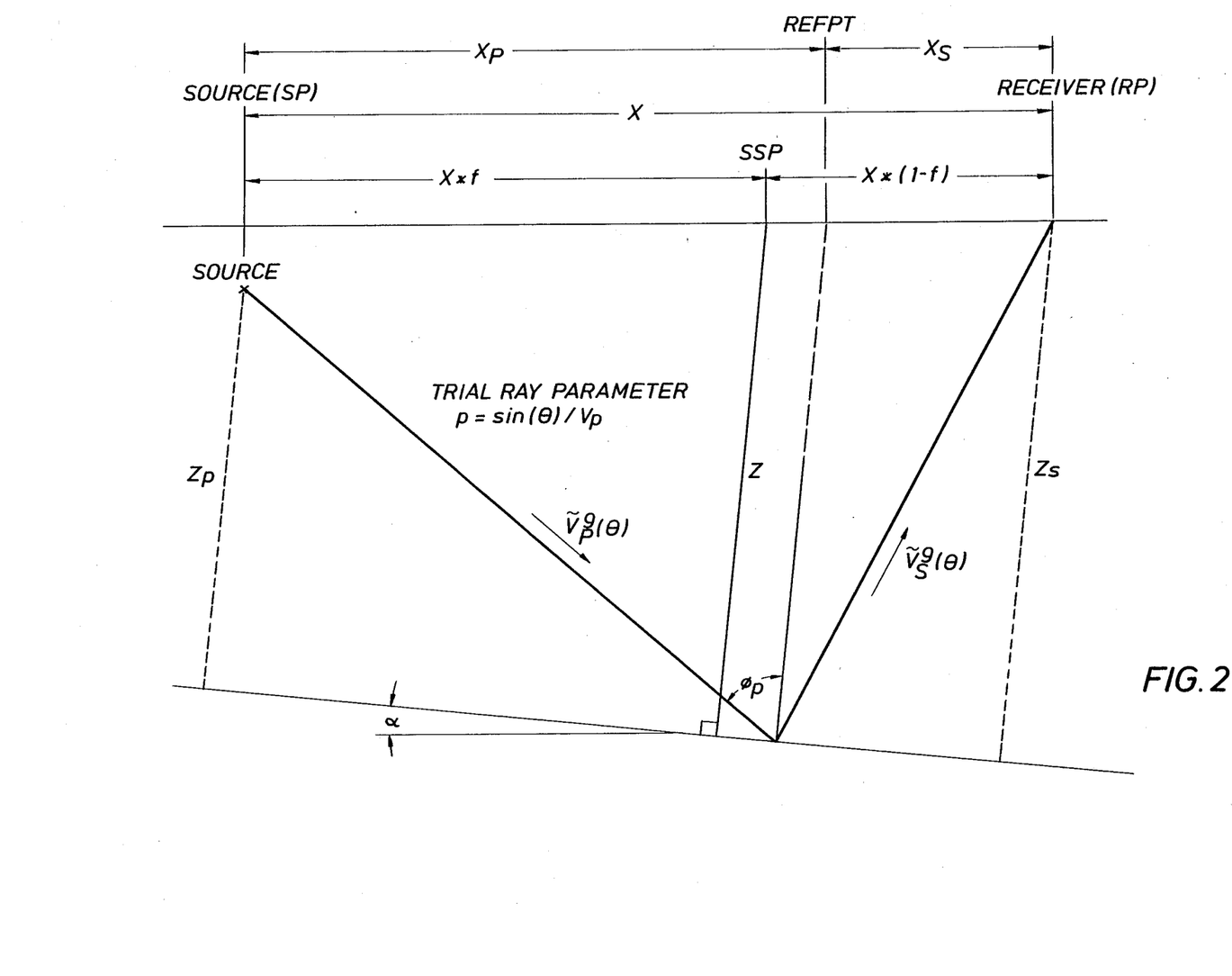
FIG. 2 depicts a simplified representation of a seismic raypath and nomenclature employed to describe the methods of the present invention.

Referring now to FIG. 2, it may be seen that in accordance with the methods of the present invention, a fractional surface sort point may be selected and fixed for a particular area of interest, i.e. a surface-sort-point (SSP) that is defined by $$SSP = f \cdot SP + (1-f) \cdot RP, \quad (5)$$

where SP is the source surface point location, RP is the receiver surface point location, and f is a fixed fractional sort-point parameter between 0 and 1. The parameter f is preferably selected so as to minimize any lateral smear of a reflection point in the desired depth interval for the offset ranges where PS reflection coefficient amplitudes may be expected to be large and taking into account the geometry employed to acquire the seismic data (i.e. the actual offsets employed). Then field data may be sorted or gathered using the selected parameter f.

A preferred method for selecting the fixed fractional sort point parameter f of the present invention is described hereinbelow. A regional velocity model may be constructed for the particular area of interest based upon previous seismic exploration activities in or near this area, or from information in the data itself. A layered, transversely isotropic velocity model is assumed based upon such a regional velocity model, which includes specification of expected layer thicknesses, vertical compressional velocities $V_P$, vertical shear velocities $V_S$, apparent P anisotropies, and apparent $S_V$ anisotropies. An alternative parameterization of this same model employs a specification of the elastic constants described hereinbefore, and equations 4 illustrate the equivalence of these parameterizations.

Ray tracing is then performed through this model for a selected range or finite number of preselected compressional wave injection angles which are representative of field conditions employed to collect the field data and at which conversion to shear probably occurred from reflecting boundaries. The methods of the present invention may employ any type of ray-tracing technique. Ray tracing methods may (in general) be formulated in a number of ways which generally are based on the assumption that the medium in which the seismic wave propagates may be subdivided into a number of simple regions. In each of these regions the wavefront propagation may be described analytically and wavefront propagation may be characterized by a ray. Snell's Law, $$\frac{\sin(\theta_i)}{V_i} = \frac{\sin(\theta_j)}{V_j} \quad (6)$$

states that, if the medium is locally homogeneous and isotropic, then the "ray parameter" $\sin(\theta)/V$ (where V is the velocity and $\theta$ is an angle specifying the direction of propagation) is constant as the wave (ray) moves from one region having velocity $V_i$ to another having velocity $V_j$.

If the medium is locally anisotropic, raytracing is more complicated, although wave propagation in anisotropic media has been thoroughly discussed in the literature ("Wave Propagation In A Stratified Medium", Geophysics, Vol. 20, No. 4, pp. 780–806 (1955) Postma, G. W.). For anisotropic media there are two vector velocities of interest, the group velocity, $V^g$, and the phase velocity $V^p$, each of which is a function of the direction of propagation. The wavepacket, or energy, travels with velocity, $V^g$, in the direction described by the angle, $\phi$, and is the important quantity to describe when the seismic energy arrives at a particular point in the medium. However, the phase velocity, $V^p$, and phase angle, $\theta$, are the quantities which are employed in Snell's Law describing the change in direction of propagation as the wave moves from one anisotropic medium to another anisotropic medium.

For the specific case of a layered transversely isotropic medium with axis of symmetry normal to the layer interfaces, ray tracing may be performed as follows. A ray is specified at the source position with a preselected phase angle $\theta$. With this angle and the P-wave and S-wave vertical velocities and apparent anisotropies, the group velocity and direction of propagation may be determined by following the procedure described by Berryman ("Long-Wave Elastic Anisotropy In Transversely Isotropic Media", Geophysics, Vol. 44, No 5, pp 896–917, (1979), Berryman J.); a ray with phase propagation direction $\theta$ in the XZ plane is characterized by the wavevector $\vec{k} = k_x \hat{x} + k_z \hat{z}$ where $\hat{x}$ and $\hat{z}$ are unit vectors in the X and Z direction, respectively, and $k_x = |\vec{k}| \sin\theta$ and $k_z = |\vec{k}| \cos\theta$. The phase and group velocities for such a ray are determined from the dispersion relations between frequency, $\omega$, and a wavevector k:

$$\omega^2 = \tfrac{1}{2}\{(A_P^{*2}V_P^2 + A_S^{*2}V_S^2)k_x^2 + (V_P^2 + V_S^2)k_z^2 \pm \quad (7)$$
$$[((A_P^{*2}V_P^2 + A_S^{*2}V_S^2 - 2V_S^2)k_x^2 - (V_P^2 - V_S^2)k_z^2)^2 +$$
$$4(V_P^2 - V_S^2)(A_P^{*2}V_P^2 - V_S^2)k_x^2 k_z^2]^{\frac{1}{2}}\},$$

where $V_P$ and $V_S$ are vertical compessional and shear velocities, respectively, and $A_P^*$ and $A_S^*$ are the apparent P-wave anisoptropy and the apparent $S_V$-wave anisotropy, respectively. The + sign is associated with the "pseudo P-wave", that is a wave whose particle motion is longitudinal in the vertical limit ($k_x=0$), and the — sign is associated with a "pseudo-$S_V$ wave", that is a wave whose particle motion is transverse in the vertical limit. The phase velocity is given by $$\overline{V^p} = \frac{\omega}{k}(\sin\theta \hat{x} + \cos\theta \hat{z}) \qquad (8)$$

and the group velocity by $$\overline{V^g} = \frac{\partial\omega}{\partial k_x}\hat{x} + \frac{\partial\omega}{\partial k_z}\hat{z} \qquad (9)$$

The group propagation direction $\phi$ is determined by $$\tan\phi = \frac{\partial\omega/\partial k_x}{\partial\omega/\partial k_z} . \qquad (10)$$

A ray is propagated through a layer of thickness $\Delta Z$ with this group velocity and direction, and the horizontal displacement is determined from $\Delta X_P = \Delta Z \tan(\phi_P)$, where the subscript P denotes the + sign in equation 7. In subsequent layers the phase velocity and direction are determined from the initial phase velocity using Snell's Law (Equation 6) and the above process of then determining the group velocity and direction, propagating the ray through a subsequent layer, and determining the horizontal displacement in each layer is repeated. For the upward path, the process is repeated using the shear group velocity, where the subscript S denotes the — sign in equation 7 and the shear-leg horizontal displacement, $\Delta X_S$, is determined from, $$\Delta X_S = \Delta Z \tan(\phi_S). \qquad (11)$$

The fractional reflection point for this particular injection angle is then given by $$f(\theta) = X_P/(X_P + X_S), \qquad (12)$$

and the total horizontal distance (offset) is
$$X(\theta) = X_P + X_S. \qquad (13)$$

For SP converted waves similiar equations may be derived and employed. Further, although dip has not been explicitly included, the inclusion of dip in the model through which the ray-tracing occurs is within the scope of the present invention. In the case of dipping reflectors the reflection points are projected to the surface along a line perpendicular to the reflector.

The subsurface reflection (conversion) points are calculated and stored as a function of the source-receiver offset distance X and the two-way travel time to the reflector along the normal incidence path, i.e. $T_0$. An amplitude term may also be calculated and stored with the foregoing stored data.

Next, the "smear" associated with the choice of any particular fractional sort point parameter is defined in terms of the difference between the nominal surface sort point (SSP) and the reflection point (REFPT) projected back to the surface along a line normal to the reflector at the reflection point:

$$S^2(f) = \frac{\int dt \int dX A(X, t) \ (SSP(f, X, t) - REFPT(X, t))^2}{\int dt \int dX A(X, t)} \qquad (14)$$

where $A(X,t)$ is a term representative of the PS reflection amplitude, which is preferably the sine of the reflection angle appropriate for the particular offset and normal incidence time. Other representative terms may be employed for $A(x,t)$. Reflection points and amplitude terms may be interpolated from the values previously calculated and stored during the ray-tracing. The appropriate value of f is selected so as to minimize the smear term in the depth range of interest (or equivalently a time interval) using offset distance limits appropriate for the acquisition and processing of the data (i.e. typically limiting X to be less than twice the depth or less than the maximum offset used during data acquisition, whichever is smaller).

Figure 3:
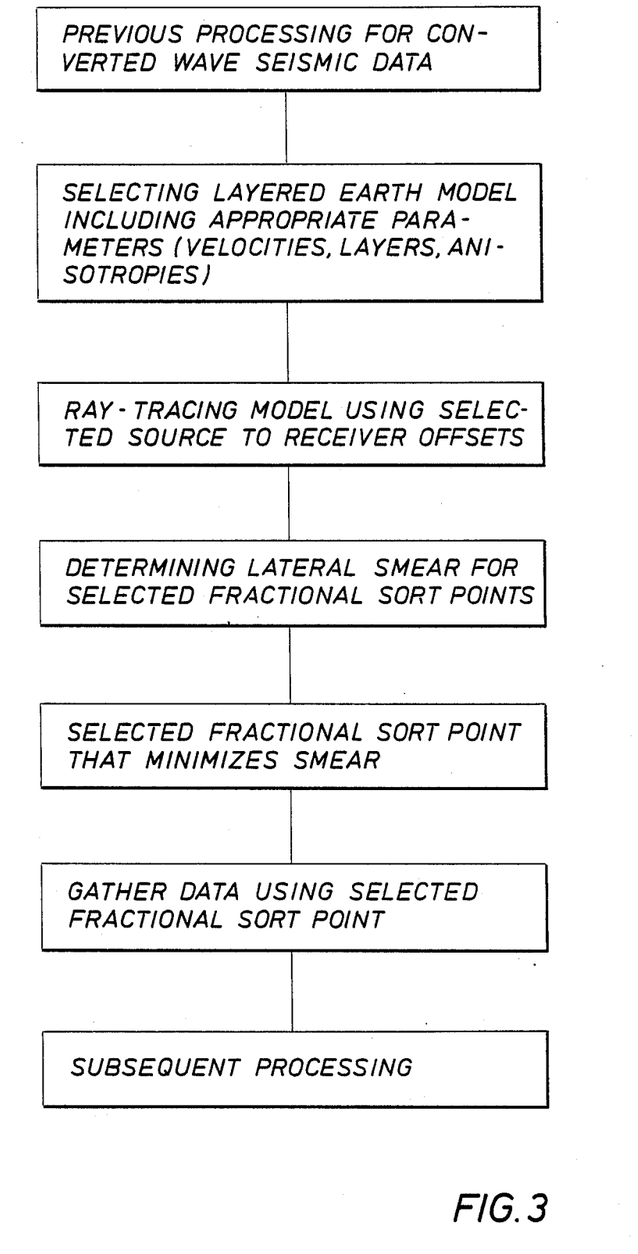
FIG. 3 depicts a simplified flow diagram of a method of the present invention.

Thus, the preferred method for determining a fractional sort point for an area of interest may be briefly summarized by referring to FIG. 3. In general, the seismic data from the area of interest may be processed in any convenient manner prior to initiation of the method of the present invention. The preferred method for determining a fractional sort point determines or selects a layered earth model (including appropriate parameters) representative of the area of interest and then employing ray-tracing through this model for a plurality of offsets representative of the acquisition geometry to determine lateral smear at a depth (or time) of interest for selected fractional sort point values or parameters. From this smear versus selected fractional sort point, a fractional sort point may be picked or selected that minimizes any lateral smear. Such a picked fractional sort point may then be employed to gather or sort the seismic data from the area of interest. Optionally, this method may be iterated as information from subsequent processing steps allows for refinements to the layered earth model (velocity model) or its parameters.

The selection of an appropriate fractional surface sort point is based upon knowledge of both the compressional and shear wave interval velocities, as well as their anisotropy factors as functions of depth. These parameters may be determined or estimated from measurements of PP and PS moveout velocities, as described in more detail later herein.

A presently preferred method of the present invention for measuring PS moveout velocities and dynamically correcting converted wave seismic data that has been preferably gathered by an appropriate fractional sort point as described hereinbefore, is described hereinbelow. This method involves making very few assumptions about the data and earth model and makes use of readily available information. It uses the same type of assumption found in conventional hyperbolic velocity analysis of PP or SS data; namely, for each depth a single layer effective velocity model may be used, except that, to accommodate PS data there are two velocities associated with the model, $V_P$ and $V_S$, as well as the dip angle of the reflector. To avoid scanning over all these parameters, the compressional wave effective velocity function and dip are assumed known based upon analysis of compressional wave data from the area of interest. Both of these additional pieces of information are usually readily available. Thus, PP effective velocities are assumed to be available (even a regional velocity model's function as described hereinbefore is generally satisfactory). The dip angle of the reflector can be estimated by measuring the time-dip from PP or PS "brute" stacked time-sections (i.e. preliminary stacks based upon limited or regional velocity models). The time-dip values are converted to angle in a velocity-dependent manner for this dynamic correction method.

Time-dip ($\Delta T_O/\Delta X$) is measured from a seismic stacked data display where the vertical scale is normal two-way travel time (time sections). The true dip, characterized by the angle $\alpha$ is given by $$\sin \alpha = \Delta Z_n/\Delta X \qquad (15a)$$

where $\Delta Z_n$ is the change in depth to the reflector of interest which occurs in a distance $\Delta X$ along the seismic line.

For PP time sections $\Delta T_{PP} = 2\Delta Z_n/V_P$ so that $$\sin \alpha = \Delta T_{PP} \Delta X (\tfrac{1}{2} V_P). \qquad (15b)$$

For PS time sections $\Delta T_{PS} = \Delta Z/V_P + \Delta Z/V_S$ so that $$\sin \alpha = \frac{\Delta T_{PS}}{\Delta X} \cdot \frac{V_P V_S}{V_P + V_S}. \qquad (15c)$$

The method also allows the use of known or estimated apparent anisotropy factors, although the moveout is fairly insensitive to these factors except in the presence of significant dip, or very large offsets.

The procedure for PS velocity analysis is to scan over trial values of $V_{ePS}, T_{OPS}$ within some predetermined range of values, dynamically correcting the data in a manner consistent with the $V_{ePS}, T_{OPS}$ pair as well as the input PP effective velocity function and dip estimates, and determining a measure of the quality of the dynamic correction result (such as for example, but not limited to semblence coefficients). After such scanning has been performed, PS effective velocity of "highest quality" (i.e. maximizes the semblance coefficient or equivalently maximizes the signal) may be picked from the results, and this function is used for final dynamic correction of the data. The procedure differs from ordinary velocity analysis of PP or SS data in the way the moveout is computed from the input parameters. For PS moveout analysis in accordance with the methods of the present invention, raytracing calculations are performed through a single homogeneous transversely isotropic medium whose axis of symmetry is perpendicular to the reflecting interface. In this case the raytracing calculations proceed as described hereinbefore, but for only a single layer, except that the coordinate system is rotated by the dip angle and the source and receiver distances to the reflector are not necessarily equal. A diagram of this particular geometry is given in FIG. 2.

The moveout time is determined by raytracing through a single layer velocity model whose properties are consistent with the specified $V_{ePS}$, $T_{OPS}$, values well as specified or known PP effective velocity function, dip estimate, and anisotropy factors. A single layer model of effective thickness Z and vertical velocities $V_P$ and $V_S$ may be determined by solving the nonlinear equations:

$$V_S = \frac{Z}{T_{OPS} - Z/V_P(Z)} \qquad (16a)$$

$$Z = \frac{T_{OPS} V_{ePS}^2}{A_P^{*2} V_P(Z) + A_S^{*2} V_S}. \qquad (16b)$$

Equation 16a expresses the shear velocity as a ratio of layer thickness to one-way shear-leg travel time through the layer. This equation is derived from equation 3d for a single layer constant velocity case when the appropriate value of $V_P$ to be used depends on the layer thickness Z. Equation 16b is derived from the single layer constant velocities case of equation 3c. The function $V_P(Z)$ is determined by interpolating the PP effective velocity function in time and inverting to obtain velocity as a function of depth. The solution of these equations is a straightforward numerical problem; a straightforward method for solving this problem is to substitute equation 16a into equation 16b and iterate:

$$Z_{new} = T_{OPS} V_{ePS}^2/[A_P^{*2} V_P(Z_{old}) + A_S^{*2} Z_{old}/ \\ (T_{OPS} - Z_{old}/V_P(Z_{old}))] \qquad (16c)$$

Having calculated moveout times $T_i(X)$ for a desired set of normal incidence times $T_{OPSi}$ the seismic data is dynamically corrected by determining the amplitude (or by interpolation between determined amplitudes) of the offset seismogram at times $T_i(X)$ and mapping (posting) this amplitude at corresponding normal incidence times $T_{OPSi}$ so as to provide data that appears to have been acquired at zero offset.

The steps for implementation of the method of the present invention may be summarized as follows:

(1) The PP effective velocity function, $V_{eP}(T_{OP})$, the dip function $D_{PS}(T_{OPS})$, or alternatively $D_P(T_{OP})$, the apparent anisotropy factors $A_P^*$ and $A_S^*$ are specified (2) Trial values of ($V_{ePS}, T_{OPS}$) are selected and for each pair the PP effective velocity and supplied values of apparent anisotropies are used to solve for a single horizontal layered model with thickness Z and vertical velocities $V_P$ and $V_S$ as described in Equations 16a and 16b.

(3) These parameters are used for a layer with the dip given at $T_{OPS}$ to solve for the moveout $T_{PS}(X)$ using a full ray-theory numerical solution for a transversely isotropic medium, as described in equations 6 to 13. This full ray-theory numerical solution is an exact solution and does not rely on an expansion in the form of Equation 1.

(4) A panel of PS seismic data representing various offset distances, which has been gathered in accordance with the fixed fractional sort point teachings herein or other types of gathers to correspond to a similar subsurface area, is dynamically corrected for this moveout and a quality-of-fit coefficient is calculated and associated with this trial pair ($V_{ePS}, T_{OPS}$).

(5) After scanning or iterating all selected ($V_{ePS}, T_{OPS}$) pairs the maxima of the quality-of-fit coefficients are found and an optimal time-varying PS effective velocity function is chosen and used for final dynamic correction of the seismic data.

(6) After such dynamic correction, the data may be stacked or otherwise systematically interpreted and displayed by conventional methods.

The key element of this method is the solution of the model for particular, selected, iterated, $T_{OPS}$, $V_{ePS}$ values given $V_{eP}(T_{OP})$, $A_P^*$, and $A_S^*$ values, and the subsequent computation of the nonhyperbolic moveout, i.e. using a full ray-theory numerical solution. All the other features such as the exact method for moveout calculation or how one selects and prepares the data, are details which may have some effect on the quality of the output, though equivalent quality may be achieved with other choices.

Figure 4:
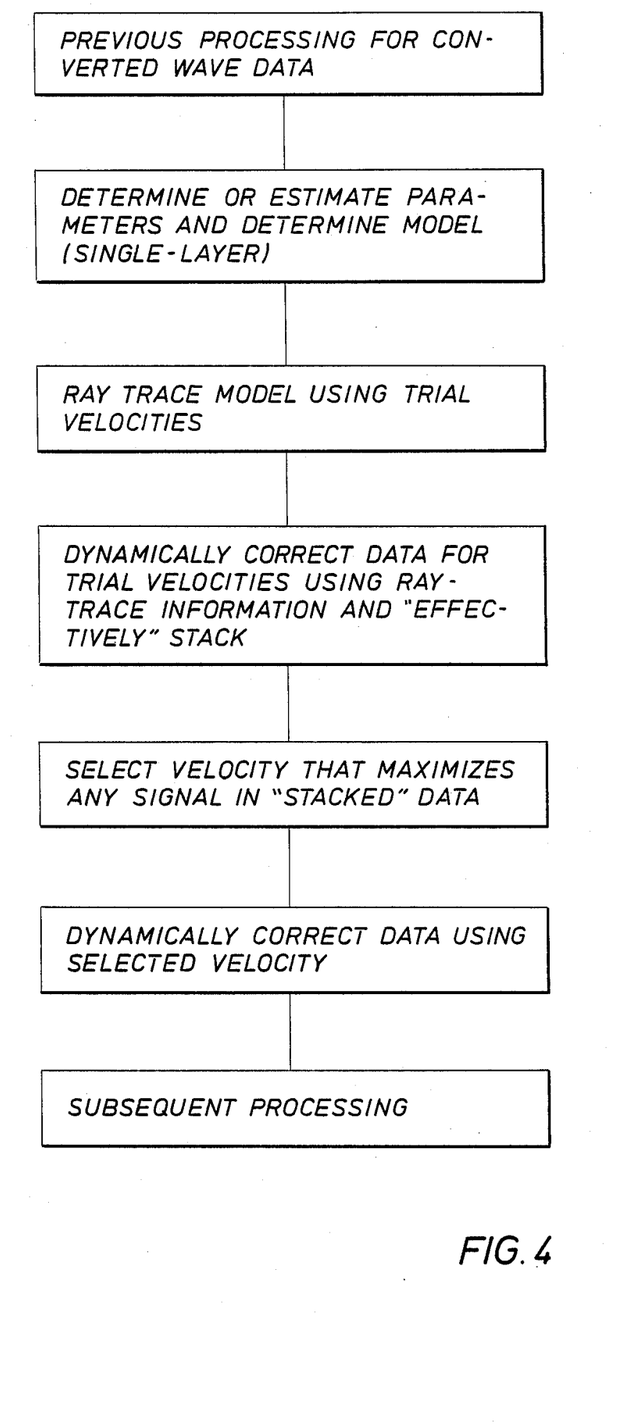
FIG. 4 depicts a simplified flow diagram of a method of the present invention.

Thus, the preferred method for dynamically correcting gathered or sorted data may be briefly summarized by referring to FIG. 4. As noted in FIG. 4, there may be previous processing steps before initiation of the method of the present invention for dynamic correction; preferably, this is a gather based upon a fractional sort point as noted hereinbefore. The method develops a single-layer model based upon known or estimated parameters and calculated parameters. Ray-tracing is performed through the single-layer model using various trial velocity values. The data from the area of interest is then dynamically corrected by adjustments for each of the various trial velocity values and actually stacked or semblance type coefficients determined. From the stacked data (or coefficients) a trial velocity is selected that maximizes the signals in the data and the data may then be dynamically corrected using this selected trial velocity. The data may then be stacked. Optionally, subsequent processing steps may be performed, which may include stacking or iterations.

Figure 5A:
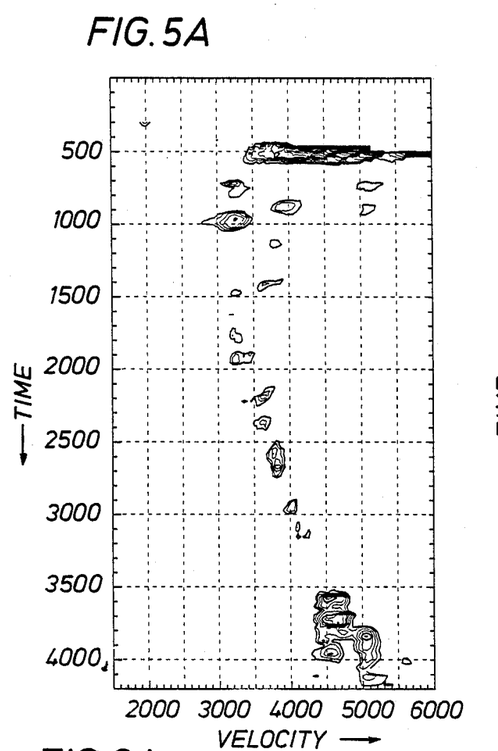
Figure 5B:
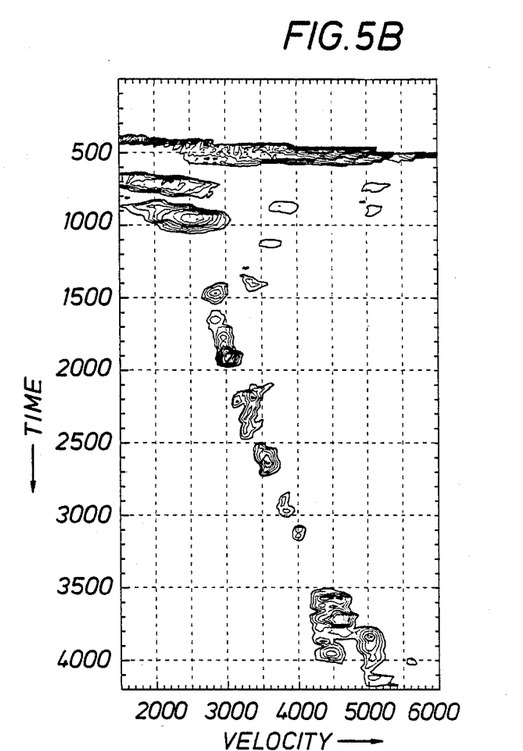
Figure 6A:
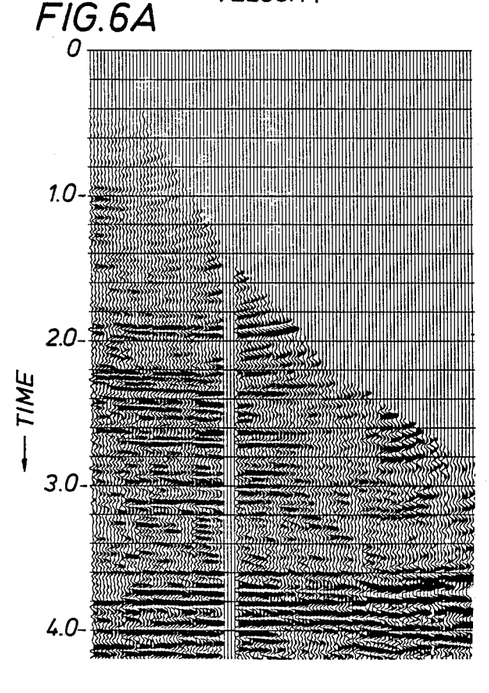
Figure 6B:
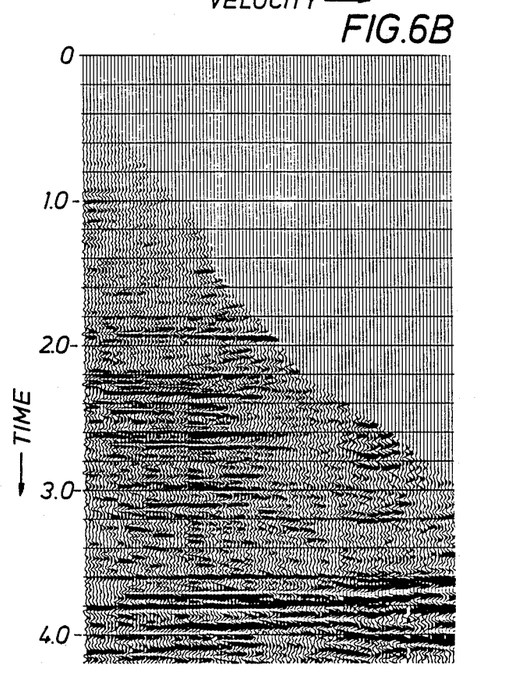

To illustrate the effectiveness of this procedure, two PS field data examples will be considered. The first is a high quality PS line in an area with little reflector dip. The velocity analysis was performed in the manner described hereinbefore and quality-of-fit coefficients were contoured as a function of trial effective velocity and normal two-way travel time. For comparison a similar display was generated using conventional hyperbolic normal moveout analysis. The two displays are shown in FIGS. 5; FIG. 5A is the conventional analysis and FIG. 5B is the analysis of the present invention. An optimal velocity function, $V_{ePS}(T_{OPS})$, was determined from each analysis and used to dynamically correct the PS seismic data. The corresponding moveout corrected panels are shown in FIGS. 6A and 6B, respectively. It is evident from both the improved quality-of-fit coefficients and lack of residual moveout in corrected panels that the methods of the present invention have had a very significant effect.

Figure 7A:
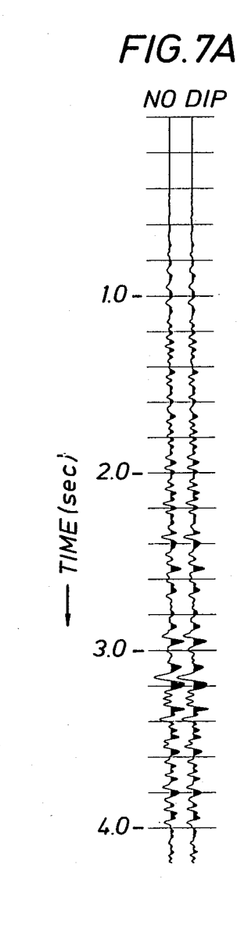
Figure 7B:
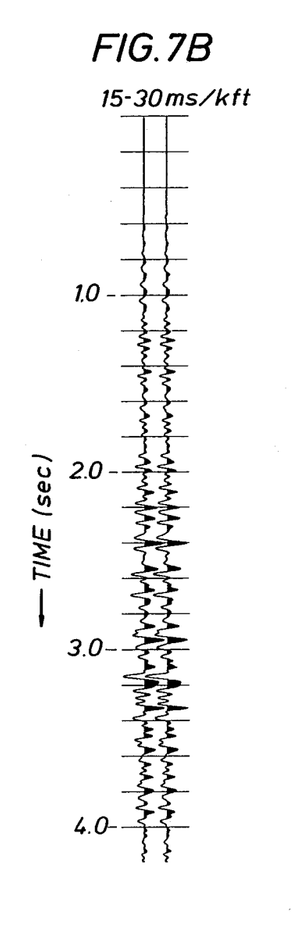
Figure 8A:
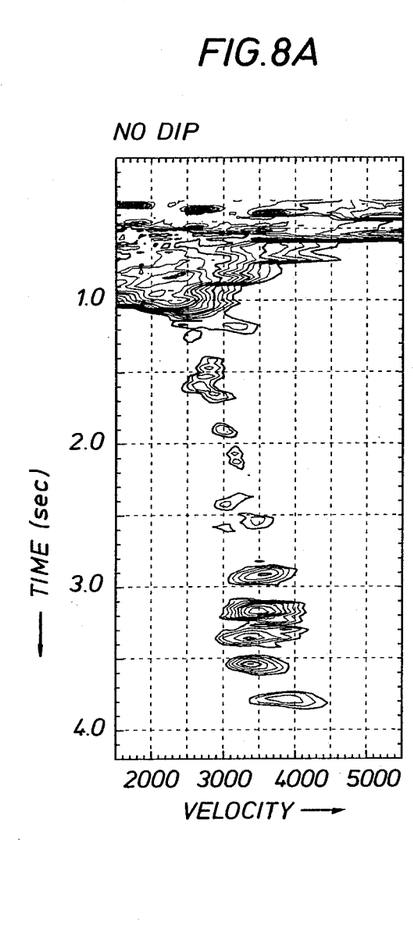
Figure 8B:
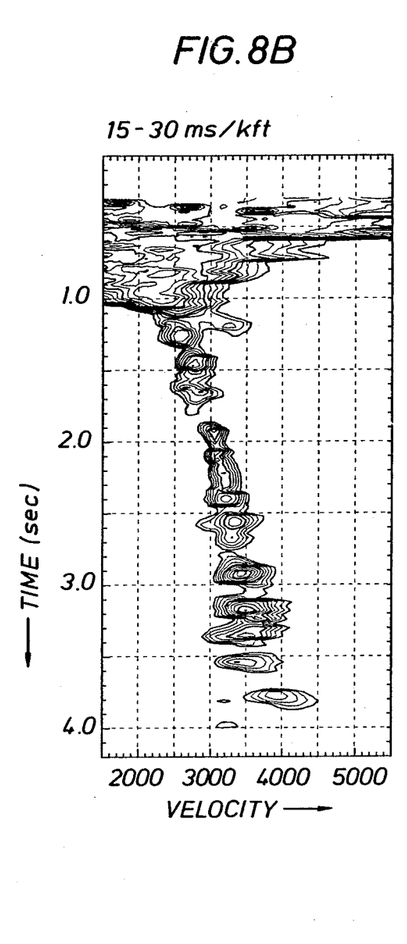

The second example is from a line with a modest amount of dip. The data was gathered in a sort corresponding to a fixed fractional surface sort point two thirds of the way from the source point to the receiver point. The dips were measured from approximate stacked seismic sections generated using limited data and regional velocity functions. In FIGS. 8 A&B the quality-of-fit coefficient contour displays are shown for velocity analysis with (FIG. 8B) and without (FIG. 8A) estimates of the reflector dip. The proper dip estimate significantly improves velocity analysis resolution as is evidenced by the increased quality-of-fit coefficients at the maxima. In FIGS. 7A and B stacked traces processed with (FIG. 7B) and without (FIG. 7A) proper dip estimates exhibit striking differences.

A preferred method of the present invention for determining interval velocities and anisotropy factors from PP and PS effective velocity measurements that may be employed in multi- or single-layer models is described hereinbelow. The effective velocity, $V_{ePS}$, (which is estimated in moveout analysis) is defined for P-wave propagation by $$V_{eP}^2 = \frac{\int dt A_P^{*2} V_P^2(t)}{\int dZ/V_P(Z)} \tag{17}$$

$$= \frac{\int dZ A_P^{*2} V_P(Z)}{T_{OP}}. \tag{18}$$

In the limiting case of isotropic media this equation reduces to equation (3). The analogous definition for converted wave propagation is derived by considering the integration to be over a path down from the source to the reflector with velocity $V_P(Z)$ and back up to the detector with velocity $V_S(Z)$. Thus, $$V_{ePS}^2 = \frac{\int dZ\{A_P^{*2}V_P(Z) + A_S^{*2}V_S(Z)\}}{\int dz\{1/V_P(Z) + 1/V_S(Z)\}} \tag{19}$$

$$= \frac{\int dZ\{A_P^{*2}V_P(Z) + A_S^{*2}V_S(Z)\}}{T_{OPS}}. \tag{20}$$

Given moveout velocity analysis measurements of $V_{eP}$ at two times $T_{OP}(1)$ and $T_{OP}(2)$, Dix ("Seismic Velocities From Surface Measurements", Geophysics 20, pp. 68–86 (1955) Dix, C. A.) has shown how to invert these data to get an estimate of the interval velocity between these two times. These expressions may then be generalized to include apparent anisotropy:

$$V_P^2 = [\Delta(T_{OP}V_{eP}^2)/\Delta T_{OP}]/A_P^{*2} \tag{21}$$

where $\Delta(T_{OP}V_{eP}^2)$ is the change in this quantity from its value at $T_{OP}(1)$ to its value at $T_{OP}(2)$, $\Delta T_{OP}$ is the two way normal incidence travel-time through the layer [i.e. $T_{OP}(2)-T_{OP}(1)$] and $A_P^*$ is the apparent P-wave anisotropy factor for this interval. It should be noted that even if anisotropy factors are set to unity and this procedure is applied to PS effective velocity measurements it will only yield interval estimates of the geometric mean velocity $(V_P V_S)^{\frac{1}{2}}$, and not separate $V_P$ and $V_S$ estimates. However, interval velocity values for both $V_P$ and $V_S$ are normally desired for interpretation analysis. The method of the present invention is for systematically determining these interval velocities in a transversely isotropic layered earth model if both PP and PS effective velocity measurements (from dynamic correction velocity analysis) or estimates are available. It is further assumed that these measurements are independent, i.e. no correspondence of PP and PS seismic reflections is required. If, however, such a correspondence can be made, the method described herein also provides an estimate of the ratio $A_S^*/A_P^*$.

The assumptions for this method are: (a) that the PP effective velocity may be suitably interpolated between known, or measured values thus defining a continuous function $V_{eP}(T_{OP})$ or, by inversion of Equation (21), $T_{OP}(Z)$; and (b) that the PS effective velocity has been measured at a discrete set of times, $T_{OPS}$, which correspond to the two-way (PS) travel times to the boundaries (top and bottom) of a layer in a layered model. Under these conditions the shear interval velocity of the i-th layer may be written as the ratio of layer thickness, $\Delta Z_i = Z - Z_{i-1}$, to the one-way travel time for a shear wave through the layer, which is the PS two-way travel time minus half the PP two-way travel time through the layer. This gives $$V_{Si} = \frac{\Delta Z_i}{\Delta T_{OPSi} - .5(T_{OP}(Z_i) - T_{OP}(Z_{i-1}))} \tag{22}$$

It is notationally convenient to define a term $Y_{PSi}$ as $$Y_{PSi} = T_{OPS} V_{ePS}^2, \tag{23}$$

for the i-th measurement of ($V_{ePS}$, $T_{OPS}$). For a constant velocity layer defined over the time interval $T_{OPS(i-1)}$ to $T_{OPSi}$ one may write from equation (20):

$$\Delta Z_i = \Delta Y_{PSi}(A_P^{*2}V_{Pi} + A_S^{*2}V_{Si})^{-1}. \quad (24)$$

Since $T_{OP}(Z)$ is assumed to be known for any Z, one may define:

$$V_{Pi} = \Delta Z_i / \Delta T_{OPi} \quad (25)$$

where $T_{OPi} = T_O(Z_i)$. The equations (22) and (24) are a set of nonlinear equations for $V_{Si}$ and $\Delta Z_i$. Equation (24) can be rewritten in a form suitable for iterative solution:

$$\Delta Z_i(\text{new}) = \Delta Z_i(\text{old}) \Delta Y_{PSi}/\Delta \tilde{Y}_{PSi} \quad (26)$$

where $\Delta Y_{PSi}$ is computed from the measured values of $V_{ePS}(T_{OPS})$ and $\Delta \tilde{Y}_{PSi}$ is determined from the concurrent estimates for $V_{Si}$ and $V_{Pi}$ equations (22) and (25) with the current estimate of Z) from $$\Delta \tilde{Y}_{PSi} = \Delta Z_i (A_P^{*2}V_{Pi} + A_S^{*2}V_{Si}). \quad (27)$$

To summarize the steps of the method:
(1) Interpolate and invert PP effective velocity data to obtain a continuous function of $T_{OP}(Z)$.
(2) Correct PS effective velocity measurement to a datum common with PP measurements.
(3) For the next PS effective velocity "event", (i.e. $V_{ePS}$, $T_{OPS}$ pair) evaluate $\Delta T_{OPS}$ and $\Delta Y_{PS}$.
(4) Make an initial estimate of the thickness $\Delta Z$.
(5) Use equations (22), (25), and (27) to evaluate $\Delta \tilde{Y}_{PS}$.
(6) Use equation (26) to compute a new trial value of $\Delta Z$.
(7) Repeat steps 4–6 until $\Delta Z$ has converged to the desired degree for this layer.
(8) Repeat steps 3–7 for each PS effective velocity "event".

The method described herein has been found to be a rapidly convergent method for finding an interval velocity model $\{V_{Pi}, V_{Si}, \Delta Z_i, i=1, N\}$ which simultaneously satisfies the independent PP and PS effective velocity measurements, given the constraints of fixed interval apparent anisotropy factors. The method may also be used for a single layer model.

Implicit in a multi-layer or single-layer model is a correspondence of PP and PS normal (vertical) travel times. That is, for some point in the earth the separate PP and PS two-way travel times to that point may be calculated from the velocity model. Since anisotropy factors have been used to relate the measured effective velocities to interval velocities, the travel time relationship between PP and PS is dependent on the particular anisotropy factors used. If independent knowledge of the correspondence of PP and PS travel times is available (such as from the examination of fully processed stacked seismic sections), this information can be used to adjust the anisotropy factors until the travel times computed from the model agree with these independent values. This procedure can be used to provide unique interval apparent anisotropy ratios ($A_S*a_P*$) in the intervals bounded by such PP—PS correspondence determinations.

The specific sequence of steps described hereinbefore for the methods of the present invention may be changed and still achieve the same result without departing from the scope of the invention.

Many other variations and modifications may be made in the techniques hereinbefore described, by those having experience in this technology, without departing from the concepts of the present invention. Accordingly, it should be clearly understood that the methods depicted in the accompanying drawings and referred to in the foregoing description are illustrative only and are not intended as limitations on the scope of the invention.

What is claimed is:

1. A method for improved resolution of reflection seismic data containing at least converted wave information, comprising:
   providing seismic field records employing known multiple source and receiver locations having a known acquisition geometry,
   selecting an appropriate layered earth model representative of the area of interest having known parameters,
   ray tracing through said model to determine reflection points, two-way travel times, and values representative of signal amplitudes for converted waves, for a plurality of offsets,
   determining for said plurality of offsets the variance between each of a plurality of fixed fractional sort points and said determined reflection points projected to the surface for at least one depth range of interest wherein said variance includes amplitude versus offset effects from said determined signal amplitudes and includes the effects of the geometry employed to generate the seismic field records,
   determining a fixed fractional sort point that minimizes said variance for all the seismic field records in the area of interest, and
   gathering the field records using said determined fixed fractional sort point.

2. The method described in claim 1, further comprising:
   (a) determining a second model representative of said area of interest having selected values for some parameters and known values for other parameters,
   (b) determining for said second model two-way travel times for offset values representative of said seismic records,
   (c) correcting said records for each offset value and various travel times by an amount dependent upon said various travel times and their corresponding zero offset times,
   (d) determining the quality of correction of said records for said parameters,
   (e) repeating the above steps a–d for different selected values for said some parameters,
   (f) choosing values of said parameters that maximize the quality of correction, and
   (g) correcting said records for each offset value and various travel times by an amount functionally related to said chosen values.

3. The method as described in claim 2, further comprising:
   determining from said parameters converted wave effective velocity and zero-offset time at the top and bottom of at least one layer of said layered earth model,
   determining compressional and shear wave interval velocities and layer thickness for said at least one layer from said effective velocities and zero-offset times, and changing said layered earth model to incorporate said determined thickness and velocities.

4. The method as described in claim 3, further comprising:
redetermining said reflection points, two-way travel times, and values representative of signal amplitudes for said plurality of offsets,
redetermining for said plurality of offsets said variance,
redetermining a fixed fractional sort point, and
regathering said field records with said redetermined fixed fractional sort point.

5. The method as described in claim 4, further comprising:
redetermining said second model and two-way travel times for said offset values,
recorrecting said records,
redetermining said function,
reselecting said values, and
recorrecting said records.

6. The method as described in claim 2, further comprising:
stacking said corrected records.

7. The method described in claim 2, further comprising:
correcting said records for static variations.

8. The method described in claim 7, further comprising:
stacking said records corrected for static variations.

9. A method for gathering converted wave seismic data, comprising:
generating seismic field records employing multiple source and receiver locations,
selecting an appropriate earth model representative of the area of interest having known parameters,
selecting a plurality of fixed fractional sort points based upon at least said model for said area of interest,
determining reflection points, two-way travel times and values representative of signal amplitudes for said model,
determining the variance between each of said reflection points projected to the surface and of each said sort points for at least one depth range of interest wherein said variance includes amplitude versus offset effects from said determined signal amplitudes and considering the geometry employed to acquire the seismic field records,
determining that said variance is less than some preselected variance for the area of interest for all the seismic field records in the area of interest, and
gathering the field data using the selected fixed fractional surface sort point.

10. A method for dynamically correcting gathered converted wave seismic data, comprising:
a. providing selected values of normal incidence travel time, $T_{OPS}$, effective velocity, $V_{ePS}$, P-wave apparent anisotropy, $A_P^*$, and S-wave apparent anisotropy, $A_S^*$, as well as the known functions, PP effective velocity, $V_{eP}(T_{OPP})$, and section dip, $D_{PP}(T_{OPP})$ (or $D_{PS}(T_{OPS})$) to obtain a single layer effective model having parameters: normal depth to reflector Z, P-wave vertical velocity $V_P$, S-wave vertical velocity $V_S$, P-wave apparent anisotropy $A_P^*$, S-wave apparent anisotropy $A_S^*$, and reflector dip angle, $\alpha$;

b. determining the corresponding travel times T(X) for each offset represented in the seismic data from ray-tracing through said model;
c. selecting a sample of data from a seismic trace of said seismic data with offset X for each value of T(X) generated in step (b);
d. shifting said sample of data by an amount corresponding to the difference between T(X) and $T_{OPS}$;
e. repeating steps b–d for each offset represented in the seismic traces of said seismic data;
f. detecting the signal in such shifted by summing or correlating the samples over all offsets;
g. repeating steps a–f for different iterated values of velocity $V_{ePS}$, and for different values of $T_{OPS}$;
h. selecting values of $V_{ePS}$ for each $T_{OPS}$ which cause the shifted data to have maximum signal amplitude; and
i. correcting the data with said selected values of $V_{ePS}$.

11. A method for processing converted wave data to provide improved resolution, comprising:
gathering said data with a fractional sort point to minimize any lateral smear that includes amplitude versus offset effects for at least one time interval of said data,
dynamically correcting said gathered data with a shear and compressional velocity to minimize any vertical smear for said at least one time interval,
correcting said data for static variations, and
stacking said data corrected for static variations.

12. A method for dynamically correcting gathered converted wave seismic data, comprising:
(a) determining a model having selected values for some parameters and known values for other parameters,
(b) ray-tracing through said model to determine two-way travel times for offset values representative of seismic data from an area of interest,
(c) adjusting said data for each offset value and various travel times by an amount dependent upon said various travel times and their corresponding zero offset times,
(d) determining the quality of correction of said data for said parameters,
(e) repeating the above steps a–d for different selected values of said some parameters,
(f) choosing values of said selected values of said some parameters that maximize the quality of correction, and
(g) adjusting said data for each offset value and various travel times by an amount dependent upon said chosen values of said selected values of said some parameters and known values for said other parameters.

13. A method for determining at least one shear interval velocity from converted wave seismic data, comprising:
determining a compressional velocity model for an area of interest;
determining converted wave effective velocities and zero-offset travel times at the top and bottom of at least one layer from converted wave dynamic correction velocity functions;
determining thickness for each said layer from an initial provided estimate, from said compressional velocity model and from said converted wave effective velocities and zero-offset travel times for said at least one layer; and determining a shear velocity for each said layer from said thickness, said compressional velocity model, and said converted wave effective velocities.

14. A method for processing converted wave seismic data, comprising:
generating seismic field records employing known multiple source and receiver locations,
selecting trial fixed fractional sort points for portions of said field records,
estimating the lateral smear of converted wave reflection points for each of said trial sort points, and
gathering said field record using a trial fixed fractional sort point that minimizes said lateral smear, wherein said lateral smear includes amplitude versus offset effects.

15. A method as described in claim 14, further, comprising:
determining the trial surface sort point that minimizes said lateral smear, and wherein
said gathering said field records step uses said determined surface sort point.

16. A method as described in claim 15, wherein said estimating the lateral smear step, comprises:
determining reflection points for said portions of said field records, and
determining the variance between surface projections of said determined reflection point and each of said trial fixed fractional surface sort points.

17. The method as described in claim 16, wherein said determining reflection points step, comprises:
determining a model for the area covered by said portions of said field records, and
ray tracing through said model to determine said reflection points.

18. A method for dynamically correcting gathered converted wave seismic data, comprising:
generating seismic field records employing known multiple source and receiver locations,
selecting a plurality of trial velocities and zero offset travel times,
determining a model representative of portions of said field records,
ray tracing through said model using said plurality of velocities and travel times to determine two way travel times for various offset values,
dynamically correcting said records for said plurality of velocities and travel times using said determined two way travel times from said raytracing step,
determining for each travel time the velocity of said plurality of velocities that provides the optimal dynamic correction, and
dynamically correcting said records with said determined velocity.

19. A method for velocity analysis of gathered converted wave seismic data, comprising:
generating seismic field records employing known multiple source and receiver locations,
selecting a plurality of trial velocities and zero offset travel times,
determining a model representative of portions of said field records,
ray tracing through said model using said plurality of velocities and travel times to determine two way travel times for various offset values,
dynamically correcting said records for said plurality of velocities and travel times using said determined two way travel times from said raytracing step, and
determining for each travel time the velocity of said plurality of velocities that provides the optimal dynamic correction.

20. A method for velocity analysis of gathered converted wave seismic data, comprising:
(a) determining a model having selected values for some parameters and known values for other parameters,
(b) ray-tracing through said model to determine two-way travel times for offset values representative of seismic data from an area of interest,
(c) adjusting said data for each offset value and various travel times by an amount dependent upon said various travel times and their corresponding zero offset times,
(d) determining the quality of correction of said data for said parameters,
(e) repeating the above steps a–d for different selected values of said some parameters,
(f) choosing values of said selected values of said some parameters that maximize the quality of correction, and
(g) determining said velocities from said chosen values.

21. A method for velocity analysis of gathered converted wave seismic data, comprising:
a. providing selected values of normal incidence travel time, $T_{OPS}$, effective velocity, $V_{ePS}$, P-wave apparent anisotropy, $A_P^*$, and S-wave apparent anisotropy, $A_S^*$, as well as the known functions, PP effective velocity, $V_{eP}(T_{OPP})$, and section dip, $D_{PP}(T_{OPP})$ (or $D_{PS}(T_{OPS})$), to obtain a single layer effective model having parameters: normal depth to reflector Z, P-wave vertical velocity $V_P$, S-wave vertical velocity $V_S$, P-wave apparent anisotropy $A_P^*$, S-wave apparent anisotropy $A_S^*$, and reflector dip angle, $\alpha$;
b. determining the corresponding travel times T(X) for each offset represented in the seismic data from ray-tracing through said model;
c. selecting a sample of data from a seismic trace of said seismic data with offset X for each value of T(X) generated in step (b);
d. shifting said sample of data by an amount corresponding to the difference between T(X) and $T_{OPS}$;
e. repeating steps b–d for each offset represented in the seismic traces of said seismic data;
f. detecting the signal in such shifted samples by summing or correlating the samples over all offsets;
g. repeating steps a–f for different iterated values of velocity $V_{ePS}$, and for different values of $T_{OPS}$; and
h. selecting values of $V_{ePS}$ for each $T_{OPS}$ which cause the shifted data to have maximum signal amplitude.

22. A method for determining at least one shear interval velocity from converted wave seismic data, comprising:
determining a compressional velocity model for an area of interest;
determining converted wave effective velocities and zero-offset travel times at the top and bottom of at least one layer from a converted wave dynamic correction velocity function for the area of interest;
providing an initial estimate of said at least one layer thickness and of shear and compressional anisotropy factors;
determining a revised thickness for each said layer from said initial estimate, said compressional velocity model, said converted wave effective velocities, said zero-offset travel times, and shear and compressional anisotropy factors for said at least one layer;
repeating the determination of said revised layer thickness with the initial thickness for each iteration being the revised thickness resulting from the previous iteration; and
determining a shear velocity corresponding to the revised layer thickness last determined.

* * * * *